(No Model.)
J. H. BLACKMAN, Jr.
DRAG SAW.
No. 520,387. Patented May 22, 1894.
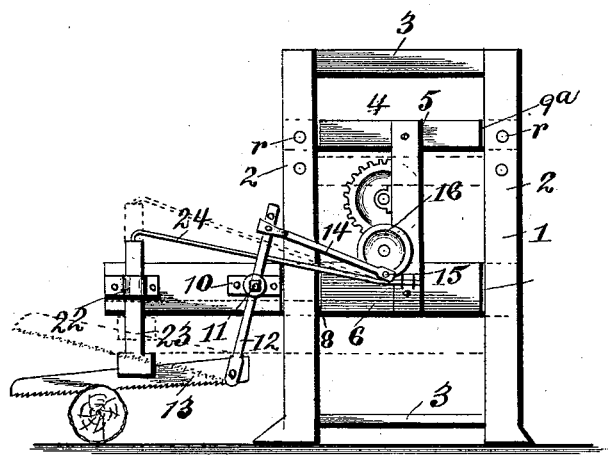
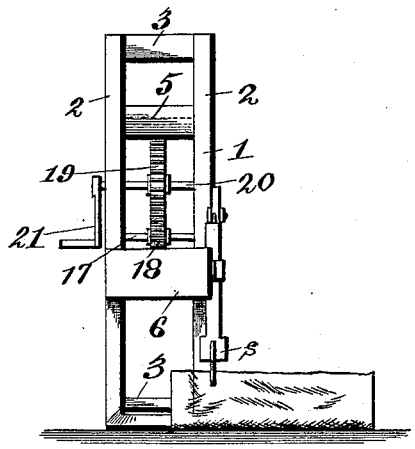
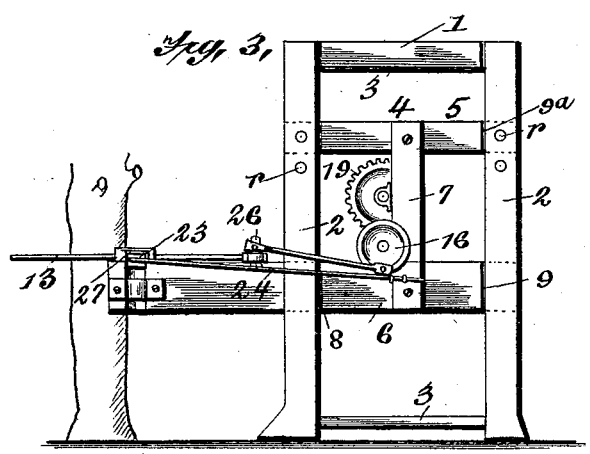
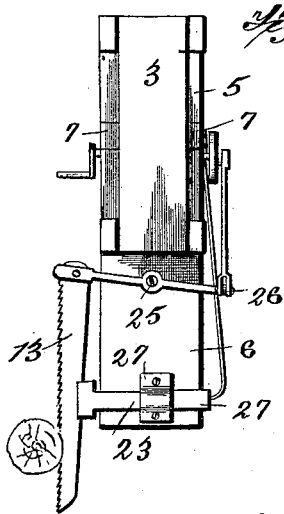
Witnesses
Inventor
Jas. H. Blackman Jr
By J. R. Nottingham
Attorney

UNITED STATES PATENT OFFICE.

JAMES H. BLACKMAN, JR., OF HARTSVILLE, ILLINOIS, ASSIGNOR OF ONE-HALF TO CHARLES H. BLACKMAN, OF SAME PLACE.

DRAG-SAW.

SPECIFICATION forming part of Letters Patent No. 520,387, dated May 22, 1894.

Application filed May 24, 1893. Serial No. 475,347. (No model.)

*To all whom it may concern:*

Be it known that I, JAMES H. BLACKMAN, Jr., a citizen of the United States, residing at Hartsville, in the county of Pope and State of Illinois, have invented certain new and useful Improvements in Drag-Saws; and I do hereby declare the following to be a full, clear, and exact description of the invention, such as will enable others skilled in the art to which it appertains to make and use the same.

This invention relates to improvements in sawing machines, more particularly to the class known as "drag-saws" wherein the saw is caused to reciprocate vertically to saw logs and horizontally to saw trees; and it consists of a vertically adjustable frame mounted in a stationary frame; a reciprocating saw pivoted to a lever fulcrumed on the base-block of the adjustable frame, and a pitman-rod connecting the lever with a crank-disk mounted on a shaft journaled in suitable bearings, said shaft being rotated by a gearing driven by any suitable power, as will be hereinafter more fully described and specifically set forth in the claim.

The object of the invention is to provide a simple and cheap sawing machine, one that can be readily moved from place to place and whose mechanism can be quickly adapted to saw either logs or trees, as may be desired. This object is attained by the mechanism illustrated in the accompanying drawings, in which—

Figure 1 represents a side elevation of my improved device, showing the saw in position to saw logs. Fig. 2, is a front elevation of the same; Fig. 3 a side elevation, showing the saw in position for sawing down trees; and Fig. 4, a top plan view of the same.

Referring to the drawings:—The numeral 1 indicates the main frame, which is composed of the upright pieces 2, 2, supported from a suitable base and connected together by cross-pieces 3 3.

The numeral 4 indicates an adjustable-frame composed of a top piece, 5, and a base piece 6, connected together by vertical pieces 7. This frame is supported between the upright pieces 2 2, and is vertically adjustable therein. The base-piece is provided with side mortises 8 and tenon 9, and the top-piece with end tenons $9^a$, to adapt them to fit and slide vertically between said upright-pieces. Holes are made in the uprights, and by means of pins $r$ the adjustable-frame may be adjusted at any desired height to adapt the saw to logs of various diameters. The base of the adjustable frame extends some distance beyond the front end of the main-frame, said extension portion forming a bearing for a spring-pressed guide or shoe for the saw as will be hereinafter described. On one side of the extension is secured a plate 10, which carries a short stud 11, on which is fulcrumed a lever 12, to one end of which is pivoted the saw 13. To the other end of the lever is pivoted the bifurcated end of a pitman-rod 14, the other end of said rod being pivoted on a crank-pin 15, secured near the periphery of a disk 16, which is mounted on one end of a shaft 17, journaled in suitable bearings secured respectively to the vertical pieces 7. Mounted on the shaft 17, between the pieces 7, is a pinion 18, which meshes with a gear-wheel 19, mounted on a shaft 20, also journaled in bearings secured to the said pieces 7. One end of said shaft projects beyond its bearing and is provided with a crank 21, to be used for rotating the shaft. On the side of the extension, near the forward end, is secured a guide-holder 22, in which operates a T-shape guide or shoe 23, slotted at $s$, to receive the saw-blade. A spring 24 having one end fastened to the side of the base 6, and the other end fitting into a perforation in one end of the T-shape guide, serves to press said guide in a direction to keep the saw constantly at its work.

As above described, the device is adapted for sawing logs, (Figs. 1 and 2,) and to adapt it for sawing down trees, the position of the lever and saw and its guide is changed to the position shown in Figs. 3 and 4. To effect this change, the pitman-rod is disconnected from the lever, and the latter from the short stud 11 on which it is fulcrumed. The lever is then fulcrumed on a short stud, 25, which is secured to upper side of the base 6, and the pitman-rod is attached to an eye-bolt, 26, which is carried at the upper end of the lever. The T shape guide is then detached from its holder and placed in a guide-holder 27, made upon the upper side of the extension. The saw-blade being placed in the slot in the T-shape guide and the spring re-adjusted, as shown in Fig. 3, the machine is ready for the operation of sawing down trees. It will be observed that the guide-holders 22 and 27 are disposed at right angles to each other, one of said guide-holders serving to hold the guide 23 in a vertical position and the other in a horizontal position, and that the saw-operating lever is so constructed that it may be fulcrumed either vertically at one side of the extension, or horizontally on the top of the same, so that the saw may be arranged to give a vertical or horizontal cut, the guide being detachable in order that it may be placed in and adapted to move in either of said guide-holders. The spring, which presses the saw to its work, is capable of a semi-rotation, so that its bent end may be turned to enter the apartment at the end of the guide, in either its vertical or horizontal position.

Other power than hand power may be employed, for instance, a band-pulley may be substituted for the crank, and a band running from its pulley to a suitable motor be used as a means for driving the operating mechanism.

Having thus fully described my invention, what I claim, and desire to secure by Letters Patent, is—

In a drag-saw machine, the combination, with the main frame, of the vertically adjustable frame having an end extension provided with vertical and horizontal guide-holders, the detachable guide or shoe adapted to operate in either of said holders, the detachable saw-operating lever, the fulcrum-pins, whereby said lever may be fulcrumed vertically or horizontally to said extension, and the gearing for actuating the lever and saw, substantially as specified.

In testimony whereof I affix my signature in the presence of two witnesses.

JAMES H. BLACKMAN, JR.

Witnesses:
LAFAYETTE S. BARGER,
JOHN N. CULLUM.